(12) United States Patent
Gilboa et al.

(10) Patent No.: US 11,968,089 B2
(45) Date of Patent: *Apr. 23, 2024

(54) REAL TIME PERFORMANCE TUNING OF NETWORK DEVICES

(71) Applicant: MELLANOX TECHNOLOGIES, LTD., Yokneam (IL)

(72) Inventors: Ido Gilboa, Nesher (IL); Shay Aisman, Zichron Yaacov (IL); Sagi Arieli, Haifa (IL); Oren Vaserberger, Adi (IL); Amit Mandelbaum, Teqoa (IL); Doron Haritan Kazakov, Jerusalem (IL); Natali Shechtman, Givat Shmuel (IL); Iftah Levi, Petah Tikva (IL); Amir Ancel, Moran (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,516

(22) Filed: Nov. 7, 2022

(65) Prior Publication Data

US 2023/0054873 A1    Feb. 23, 2023

Related U.S. Application Data

(63) Continuation of application No. 17/129,978, filed on Dec. 22, 2020, now Pat. No. 11,546,216.

(51) Int. Cl.
*H04L 41/0823*    (2022.01)
*H04L 41/08*    (2022.01)
(Continued)

(52) U.S. Cl.
CPC ........ *H04L 41/0836* (2013.01); *H04L 41/083* (2013.01); *H04L 41/085* (2013.01);
(Continued)

(58) Field of Classification Search
CPC ....... H04L 41/147; G06N 5/022; G06Q 10/04
See application file for complete search history.

(56) References Cited

U.S. PATENT DOCUMENTS 6,418,398 B1 *   7/2002   Dueck ............... H04L 45/14
                                                   705/7.41
8,516,586 B1     8/2013   Jensen et al.
(Continued)

OTHER PUBLICATIONS

Zhu et al., "Congestion Control for Large-Scale RDMA Deployments", SIGCOMM'15, London, UK, pp. 523-536, Aug. 17-21, 2015.

(Continued)

*Primary Examiner* — Joseph L Greene
(74) *Attorney, Agent, or Firm* — KLIGLER & ASSOCIATES PATENT ATTORNEYS LTD.

(57) ABSTRACT

A network device (ND) includes packet processing circuitry and performance optimization circuitry. The packet processing circuitry is connected to a network and is configured to process communication packets for communicating over the network. The packet processing circuitry includes a plurality of configuration registers for setting one or more operation parameters of the ND. The performance optimization circuitry is configured to improve a performance measure of the ND by iteratively calculating the performance measure and adjusting values of one or more of the configuration registers based on the performance measure.

26 Claims, 4 Drawing Sheets

(51) Int. Cl.
    *H04L 41/083*     (2022.01)
    *H04L 41/085*     (2022.01)
    *H04L 41/0866*     (2022.01)
    *H04L 47/283*     (2022.01)

(52) U.S. Cl.
    CPC ...... *H04L 41/0866* (2013.01); *H04L 41/0886* (2013.01); *H04L 47/283* (2013.01)

(56) References Cited

U.S. PATENT DOCUMENTS

| | | | |
|---|---|---|---|
| 9,159,027 B2* | 10/2015 | Flinn | G06N 5/022 |
| 11,537,878 B2* | 12/2022 | Silberman | G06N 3/006 |
| 11,546,216 B2 | 1/2023 | Gilboa et al. | |
| 2004/0025044 A1 | 2/2004 | Day | |
| 2006/0019679 A1 | 1/2006 | Rappaport et al. | |
| 2006/0241986 A1* | 10/2006 | Harper | G06Q 10/04 |
| | | | 705/7.11 |
| 2006/0294220 A1* | 12/2006 | Asahara | H04L 43/16 |
| | | | 709/224 |
| 2007/0008884 A1 | 1/2007 | Tang | |
| 2008/0049626 A1* | 2/2008 | Bugenhagen | H04L 43/091 |
| | | | 370/389 |
| 2013/0083806 A1 | 4/2013 | Suarez Fuentes et al. | |
| 2014/0164640 A1 | 6/2014 | Ye et al. | |
| 2016/0285966 A1 | 9/2016 | Brech et al. | |
| 2017/0366398 A1 | 12/2017 | Mizrachi | |
| 2019/0236464 A1* | 8/2019 | Feinson | G06N 5/04 |
| 2020/0012947 A1* | 1/2020 | Barton | G06Q 30/0611 |
| 2020/0236038 A1 | 7/2020 | Liu et al. | |
| 2020/0241159 A1* | 7/2020 | Willis | G01V 1/42 |
| 2020/0267053 A1 | 8/2020 | Zheng et al. | |
| 2021/0273869 A1 | 9/2021 | Tourrilhes et al. | |
| 2022/0295311 A1* | 9/2022 | Chuai | H04W 28/18 |

OTHER PUBLICATIONS

Whitley, "A Genetic Algorithm Tutorial", Statistics and Computing, vol. 4, issue 2, pp. 1-37, year 1998.

Infiniband Trade Association, "InfiniBand Architecture Specification", vol. 1, release 1.2.1, pp. 1-1727, Nov. 2007.

Bilal et al., "Towards automatic parameter tuning of stream processing systems", Proceedings of the 2017 Symposium on Cloud Computing, pp. 189-200, year 2017.

Heinze et al., "Online parameter optimization for elastic data stream processing", Proceedings of the Sixth ACM Symposium on Cloud Computing, pp. 276-287, year 2015.

Herodotou et al., "A survey on automatic parameter tuning for big data processing systems", ACM Computing Surveys, vol. 53, No. 2, article 43, pp. 1-37, Apr. 2020.

Trotter et al., "Into the storm: Descrying optimal configurations using genetic algorithms and bayesian optimization", IEEE 2nd International Workshops on Foundations and Applications of Self* Systems (FAS*W), pp. 175-180, year 2017.

Wang et al., "A novel method for tuning configuration parameters of spark based on machine learning", IEEE 18th International Conference on High Performance Computing and Communications, pp. 586-593, year 2016.

Ye et al., "A recursive random search algorithm for large-scale network parameter configuration", Proceedings of the ACM SIGMETRICS International Conference on Measurement and Modeling of Computer Systems, pp. 196-205, year 2003.

Wikipedia, "Real-time," pp. 1-2, last edited Nov. 21, 2020, as downloaded from https://en.wikipedia.org/wiki/Real-time.

Chasdai et al., U.S. Appl. No. 17/582,040, filed Jan. 24, 2022.

* cited by examiner

REAL TIME PERFORMANCE TUNING OF NETWORK DEVICES

CROSS-REFERENCE TO RELATED APPLICATIONS

This application is a continuation of U.S. patent application Ser. No. 17/129,978, filed Dec. 22, 2020, whose disclosure is incorporated herein by reference.

FIELD OF THE INVENTION

The present invention relates generally to communication networks, and particularly to real time performance tuning of network-connected devices.

BACKGROUND OF THE INVENTION

Network-connected devices (NCDs) such as network interface controllers, host channel adapters, network-enabled graphic processing units (GPUs), network switches or routers, typically communicate with communication networks such as Ethernet or InfiniBand™.

SUMMARY OF THE INVENTION

An embodiment of the present invention that is described herein provides a network device (ND) including packet processing circuitry and performance optimization circuitry. The packet processing circuitry is connected to a network and is configured to process communication packets for communicating over the network. The packet processing circuitry includes a plurality of configuration registers for setting one or more operation parameters of the ND. The performance optimization circuitry is configured to improve a performance measure of the ND by iteratively calculating the performance measure and adjusting values of one or more of the configuration registers based on the performance measure.

In some embodiments, the optimization circuitry is configured to adjust the values of the one or more of the configuration registers responsively to a parameter ruleset, which sets one or more constraints on the one or more of the operation parameters. In some embodiments, the optimization circuitry is configured to adjust the values of the one or more of the configuration registers responsively to a cross-parameters ruleset, which sets one or more constraints on inter-dependency between at least two of the operation parameters.

In some embodiments, the optimization circuitry is configured to improve the performance measure of the ND by (i) selecting an initial group of candidate vectors, each vector specifying the values for a respective subset of the configuration registers, and (ii) modifying the candidate vectors in an iterative process, by adjusting the values of the one or more configuration registers responsively to the performance measure corresponding to the candidate vectors. In an example embodiment, the optimization circuitry is configured to (i) store a value of the performance measure at a first stage of the iterative process, (ii) at a second, later stage of the iterative process, assess an extent of change of the performance metric relative to the stored value, and (iii) refresh one or more of the candidate vectors responsively to the value exceeding a threshold.

In a disclosed embodiment, the optimization circuitry is configured to improve the performance measure of the ND by iteratively modifying a group of candidate vectors, each vector specifying a respective subset of the configuration registers, using a genetic algorithm comprising: i) a parents selection step, in which pairs of candidate vectors are selected, ii) a cross-over step, in which child vectors are generated by mixing values of pairs of candidate vectors, iii) a mutation step, in which mutated child vectors are generated by modifying the child vectors and, iv) a fittest-selection step, in which candidate vectors for an iteration are selected responsively to the performance measure of the mutated child vectors of a previous iteration.

In an embodiment, the optimization circuitry is configured to improve the performance measure of the ND by iteratively modifying a group of candidate vectors, each vector specifying a respective subset of the configuration registers, using a genetic algorithm comprising: i) a mutation step, in which candidate vectors are modified, and ii) a cross-over step, in which child vectors are generated by mixing values of pairs of candidate vectors.

In an example embodiment, the performance measure is indicative of a receive bandwidth. In another embodiment, the performance measure is indicative of a transmit bandwidth. In yet another embodiment, the performance measure is indicative of a packet drop rate. In still another embodiment, the performance measure is indicative of a packet pause rate. In a disclosed embodiment, the performance measure is indicative of a combination of latency and memory utilization. In another embodiment, the performance measure is indicative of a bit-error rate (BER).

There is additionally provided, in accordance with an embodiment of the present invention, a method in a network device (ND) connected to a network. The method includes processing communication packets for communicating over the network using packet processing circuitry in the ND. The packet processing circuitry includes a plurality of configuration registers for setting one or more operation parameters of the ND. Using performance optimization circuitry in the ND, a performance measure of the ND is improved by iteratively calculating the performance measure and adjusting values of one or more of the configuration registers based on the performance measure.

The present invention will be more fully understood from the following detailed description of the embodiments thereof, taken together with the drawings in which:

DETAILED DESCRIPTION OF EMBODIMENTS

Overview

Network Connected Devices (NCDs; also referred to as Network devices—NDs), such as network adapters, network-enabled GPUs, packet switches and routers, typically comprise configuration registers that set the values of various operation parameters. The parameters may include, for example, sizes of various queues, size of a Tx burst, number of credits, and others. Various communication performance measures of the NCD may be controlled by setting suitable values to some or all the operation parameters. For example, larger queues may improve (increase) a bandwidth performance measure but worsen (increase) the communication latency.

Optimized sets of parameters may be calculated by various algorithms, as well as by trial-and-error. However, the optimal set of parameters may change with time, as the nature of the communication traffic changes (e.g., numerous short packets replace a smaller number of long packets).

Embodiments according to the present invention provide methods and apparatuses that constantly modify the operation parameters during actual operation of the NCD in a network, in order to tune the NCD performance in real time. In an embodiment, the NCD uses genetic algorithms for performance optimization. (For a tutorial on genetic algorithms, please refer to Whitley, Darrell (1994), "A genetic algorithm tutorial"—Statistics and Computing, Volume 4, Issue 2, pages 65-85.)

We will refer to hereinbelow to combining parameters from two parents as "cross-over", "cross-over-breeding" or, in short, "crossbreeding"; we will further refer to randomly changing some parameters of a vector as "mutating". In some embodiments, the NCD first generates a set of candidate vectors, each vector comprising a set of parameters, then crosses-over vector pairs to generate child vectors, mutates the child vectors, selects the fittest child vectors (e.g., vectors with the best performance, referred to as "best-performing vectors" hereinbelow) and then re-crosses-over the selected vectors.

In other embodiments, the "selection of the fittest" step is not needed; instead, the NCD mutates and/or crosses-over vectors respective to their relative performance (e.g., a poorly performing vector is more aggressively mutated).

In some embodiments, the NCD may refresh the genetic algorithm by aggressively modifying the vector set if the NCD finds that the performance has decreased by more than a preset threshold.

Embodiments according to the present invention may be used to optimize a variety of performance measures, including (but not limited to) transmit bandwidth, receive bandwidth, latency, packet-drop-rate, memory utilization and power consumption. In other embodiments, combined performance measures such as concurrent bandwidth and latency may be optimized.

System Description

Figure 1:
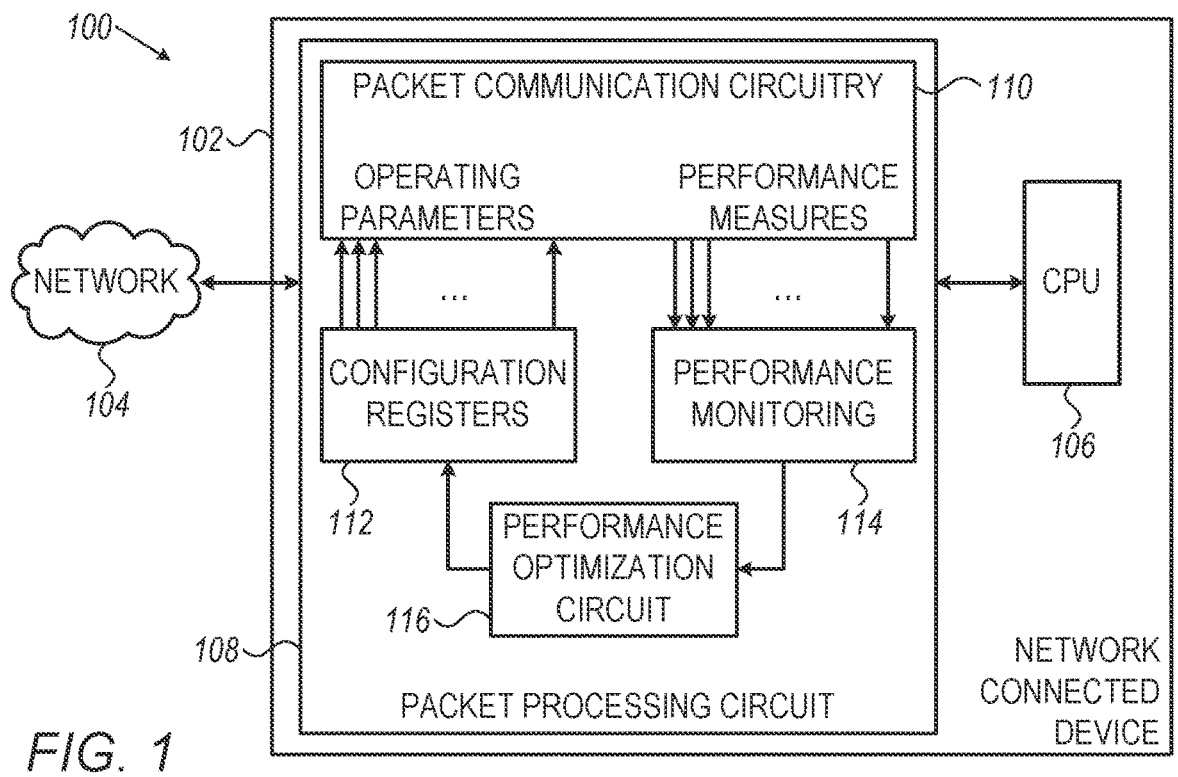
FIG. 1 is a block diagram that schematically illustrates a network-connected device (NCD) with real-time performance tuning, in accordance with an embodiment of the present invention.

FIG. 1 is a block diagram 100 that schematically illustrates a network-connected device (NCD) 102 with real-time performance tuning, in accordance with an embodiment of the present invention. NCD 102 is coupled to a communication network 104, such as Ethernet or InfiniBand™ (or any other suitable communication network). NCD 102 may be any device that is coupled to a communication network, including but not limited to network adapters such as network interface controllers (NICs) and host channel adapters (HCAs), switches, routers, communication hubs, network-enabled Graphic Processing units (GPUs), network-enabled Data-Processing units (DPUs) and compute nodes.

According to the example embodiment illustrated in FIG. 1, NCD 102 comprises a Central Processing Unit (CPU) 106 that runs application software and communicates packets over the network through a Packet Processing Circuit 108 that processes ingress and egress packets. The packet processing circuit comprises a packet communication circuitry 110, which is configured to perform various packet processing and routing tasks, including but not limited to packet parsing, packet classification, security checking, routing, packet-queuing and others.

Packet processing circuit 108 further comprises a set of configuration registers 112, a Performance Monitoring circuit 114 and a Performance Optimization circuit (POC) 116 (in embodiments, POC 116 may comprise a Reduced Instruction Set Computer (RISC), that runs firmware (FW) code). Configuration Registers 112 store various operation parameters such as queue sizes, packets sizes, thresholds of congestion control algorithms and others. The settings of the configuration registers may affect various aspects of the NCD network performance (for example bandwidth, latency, packet drop rate and power consumption). Typically, parameter values adhere to a parameter ruleset, which defines conditions that the parameter values should meet, such as upper and lower constraints to the values of the parameters, and to a cross-parameter ruleset, which defines relationships between values of different parameters.

Performance Monitoring Circuit 114 is configured to measure various aspects of the performance; for example, the performance monitoring circuit may log the power consumption, the communication bandwidth, the packet rate, the latency, the cache miss ratio, a host fairness measure and the packet-drop/pause rate. In some embodiments the performance monitoring circuit comprises counters and timers. In embodiments, the Performance Monitoring Circuit may be configured to log combined performance functions, e.g., bandwidth divided by power consumption, and to output predefined performance measures.

Coupled to the performance monitoring circuit and to the configuration circuit, POC 116 is configured to modify operation parameters that are stored in the configuration registers to improve various performance aspects of the NCD. In some embodiments, the POC runs a performance optimization algorithm that is configured to improve performance aspects of the NCD by reading a set of performance measures from the performance monitoring circuit, finding better sets of operation parameters, and programming configuration registers with the parameters sets.

In typical communication networks, the nature of the communication, for example the mix of various packet types, the packet arrival frequency, the sending rate (bandwidth), the burst rate, the number of senders, the number of receivers, and/or other network communication patterns, changes in time. Respectively, the optimal set of parameters that the NCD should use may vary. For example, small buffer sizes may be preferrable for the communication of short and frequent packets. In embodiments, the performance optimization algorithm always runs continually, adjusting the operation parameters respective to changes in the nature of the communication.

Thus, according to the example embodiment illustrated in FIG. 1, the NCD continuously tunes its performance to best fit the changing nature of the communication, by the continuous adjustment of operation parameters.

As would be appreciated, the structure of NCD 102 described above is cited by way of example. NCDs in accordance with the disclosed techniques are not limited to the description hereinabove. For example, in alternative embodiments the NCD may comprise multiple CPUs. In some embodiments, CPU 106 comprises a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
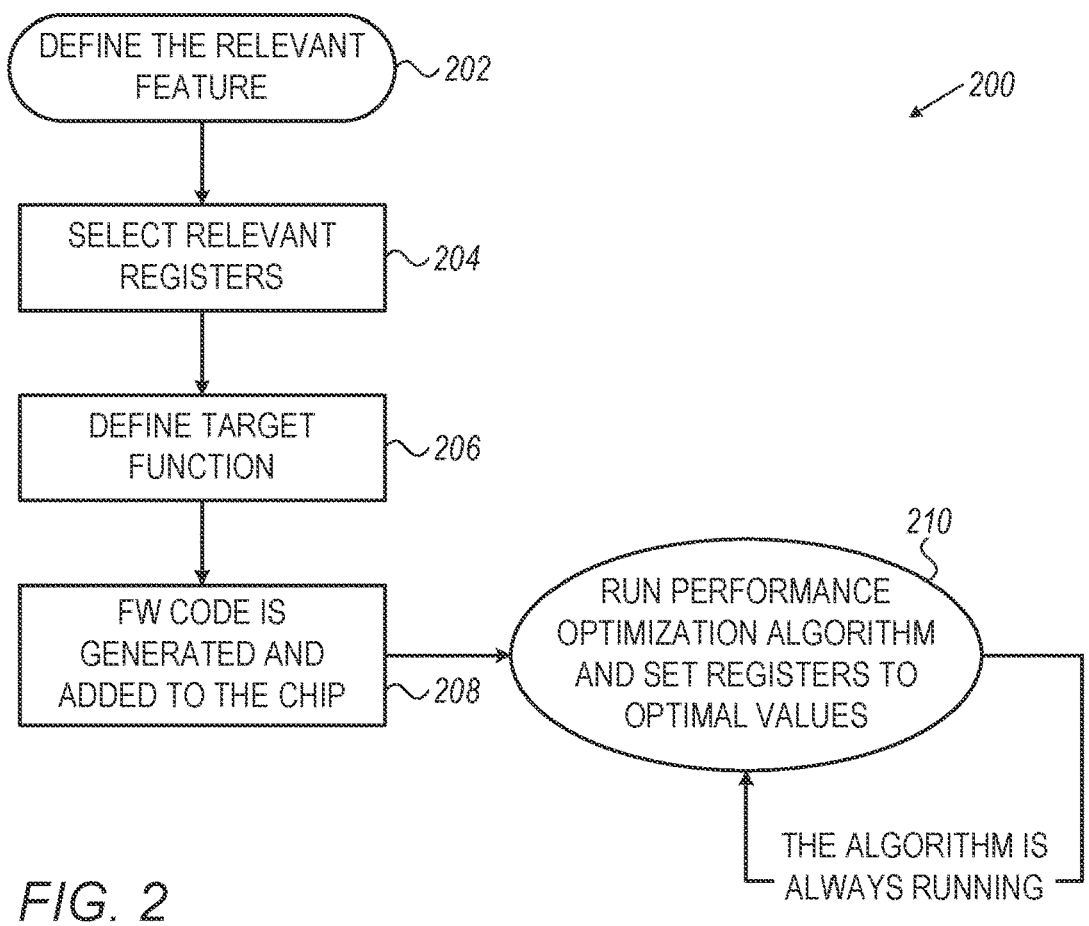
FIG. 2 is a flowchart that schematically describes a method for production-programming and field operation of an NCD with real-time performance tuning, in accordance with an embodiment of the present invention.

FIG. 2 is a flowchart 200 that schematically describes a method for production-programming and field operation of an NCD with real-time performance tuning, in accordance with an embodiment of the present invention. The flowchart starts at a Define Relevant Features step 202, wherein engineers (typically NCD vendor engineers) define a set of performance aspects that are to be optimized. Such performance aspects may comprise, for example, bandwidth and latency. Next in the select relevant register step 204 the engineers define a set of registers that store the operation parameters that may affect the required performance aspects.

In a Define target function step 206, the engineers define a target function, which may be a performance measure, or a combination of a plurality of performance measures. Next, at a Generate Firmware Code step 208, the engineers add a corresponding optimization code to the firmware of the NCD.

At the customer site, once the NCD is coupled to the network, the Performance Optimization Circuit 116 (FIG. 1) of the NCD continuously executes a Run Optimization Algorithm step 210. Thus, the target function defined by the user is continuously modified, for optimal performance under varying network conditions.

As would be appreciated, the method of flowchart 200 described above is cited by way of example. Other flowcharts may be used in alternative embodiments. For example, NCD vendors may send optimization firmware to NCDs that are already installed, replacing fixed-parameter algorithms, or improving real-time tuning algorithms.

Genetic Algorithms

In some embodiments, the optimization algorithm that Performance Optimization Circuit 116 executes may be a genetic algorithm, in which a population of candidate solutions to an optimization problem is evolved toward better solutions, by crossbreeding and randomly mutating the candidate solutions, and, typically, by selecting the fittest mutations. For a tutorial on genetic algorithms, please refer to Whitley (quoted above).

Figure 3:
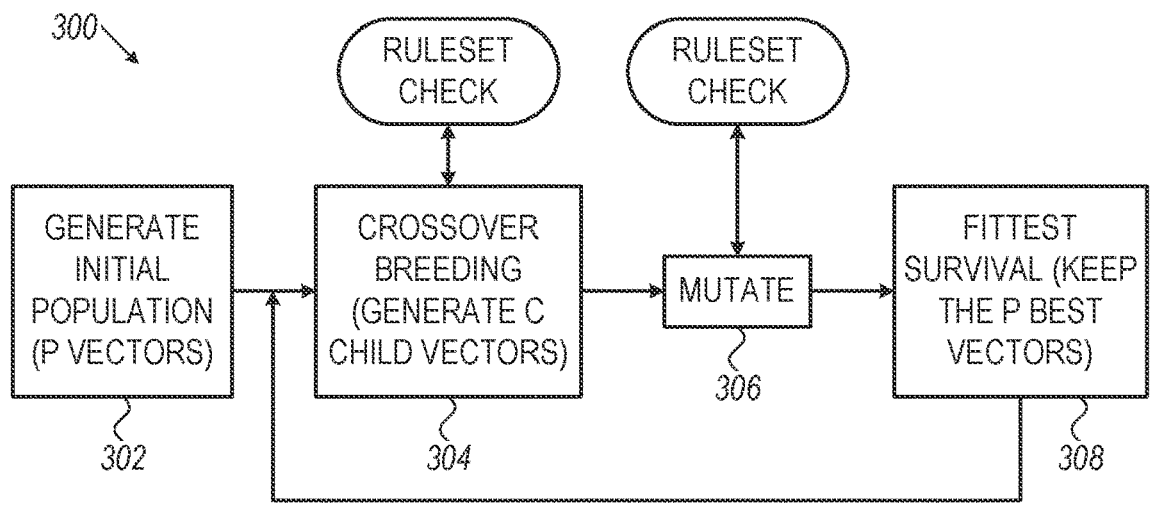
FIG. 3 is a flowchart that schematically describes a first method for performance optimization of an NCD, in accordance with an embodiment of the present invention.

FIG. 3 is a flowchart 300 that schematically describes a first method for performance optimization of an NCD, in accordance with an embodiment of the present invention. The flowchart is executed by POC 116 (FIG. 1).

We will refer to a set of values for the operation parameters (that are stored in one or more configuration registers) as "vectors" or "candidate vectors" hereinbelow; we will further refer to a group of candidate vectors ("population" in genetic-algorithms nomenclature) as a vector-set.

The flowchart starts at a Generate-Initial-Population step 302, wherein the POC creates an initial vector-set comprising P vectors. In some embodiments, the initial vector set is predefined; in other embodiments, the initial vector set may be generated by randomly changing a single predefined vector. Other suitable techniques for the generation of the initial vector set may be used in alternative embodiments.

After creating the initial vector set, the POC enters a Crossover-Breeding step 304 (also referred to as Crossbreeding below), wherein the POC generates C child vectors from couples of parent vectors of the vector set (C 2P). Each child vector comprises a mix of parameters from the two parent vectors. In some embodiments, the parent selection for each parameter is fixed (e.g., the first n parameters are copied from a first parent, and the remaining parameters are copied from the second parent). In other embodiments, parent selection for each parameter is random, and in yet other embodiments the selection is weighted-random, wherein parameters of the better performing parent are more likely to be selected. In embodiments, step 304 comprises ruleset checking, wherein the parameter values of each generated child vector are checked for compliance to preset parameter ruleset and cross-parameter ruleset.

The POC next enters a Mutate step 306, wherein each of the child vectors is mutated by randomly modifying some or all the parameter values. In some embodiments, the intensity of the parameter modification (e.g., the expectancy of the ratio between the mutated parameter and the original parameter values) is determined responsively to the performance of the vector.

Step 306 comprises ruleset checking wherein each vector is checked for compliance to a parameter ruleset (e.g., a minimum and a maximum value for each parameter), and compliance to a cross-parameter ruleset. If any of the rules are not obeyed, the mutation process may restart.

After step 306 the POC enters a Fittest-Survival step 308, wherein P-C vectors having the lowest performance are "killed". The POC then reenters step 304, to crossbreed the remaining P vectors.

It is important to note that, according to the example embodiment described herein, in no stage does the POC stores a best vector in the configuration registers—rather, the POC continuously modifies the configuration registers, loading new candidate vectors and measuring the resultant performance.

Figure 4:
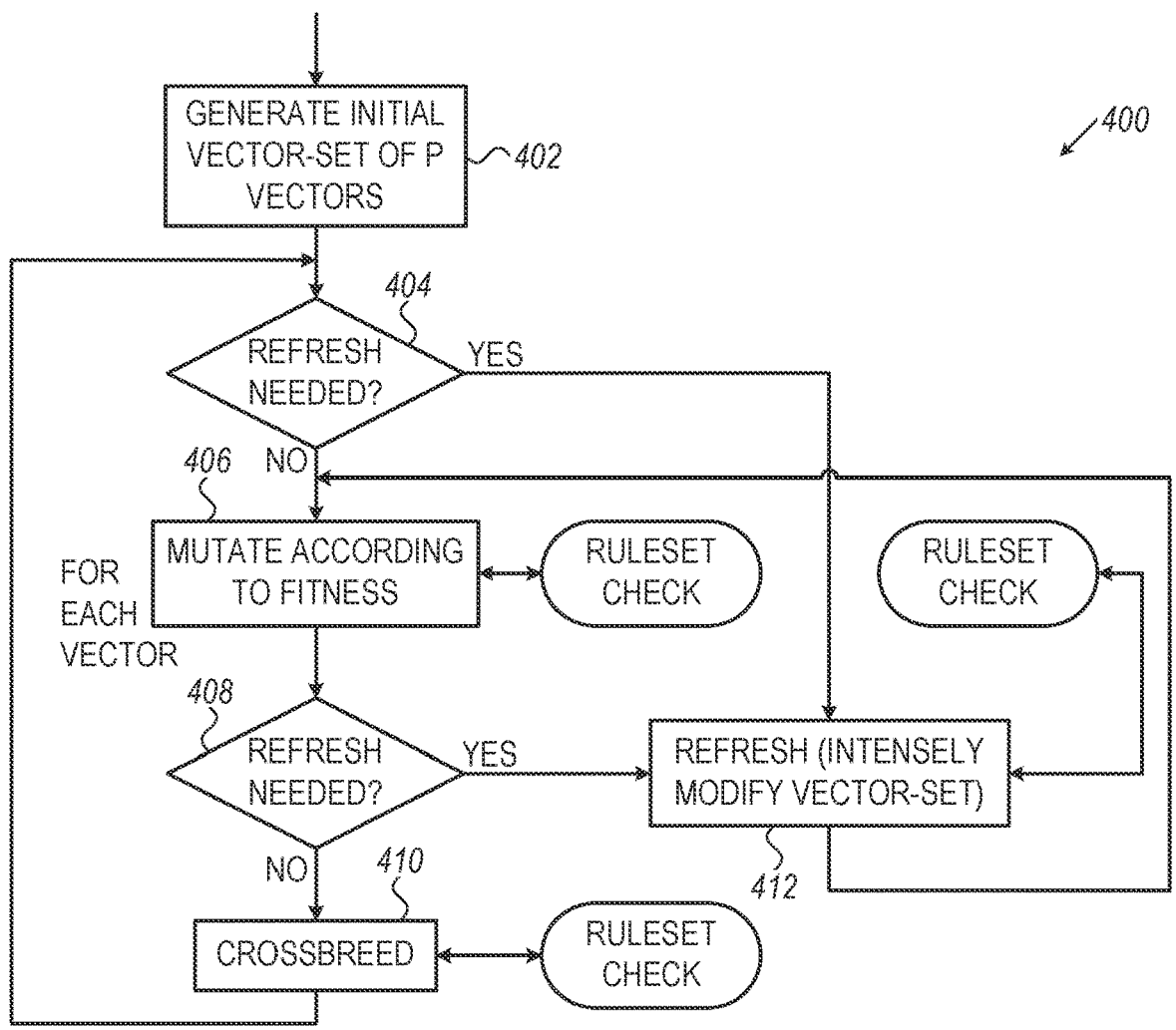
FIG. 4 is a flowchart that schematically describes a second method for performance optimization of an NCD, in accordance with an embodiment of the present invention.

FIG. 4 is a flowchart 400 that schematically describes a second method for performance optimization of an NCD, in accordance with an embodiment of the present invention. The flowchart is executed by POC 116 (FIG. 1). According to the method described in the example embodiment of FIG. 4, if the genetic algorithm generates a population with substantially inferior performance from the performance of a previous vector set, the set of vectors is intensely modified. This technique, analogous to thermal annealing, attempts to shift the vectors from a local maximum to which the algorithm may have converged. Other important differences between flowchart 300 (FIG. 3) and flowchart 400 are: i) mutating of parent vectors (flowchart 400) vs. mutating of child vectors (flowchart 300), and, ii) there is no fittest-survival step in flowchart 400—the population remains constant after the crossbreeding step.

Flowchart 400 starts at a Generate Initial Vector Set step 402, wherein the POC creates an initial vector-set comprising P vectors. Like in step 302 of flowchart 300 (FIG. 3), the initial vector set may be generated by a variety of procedures, including but not limited to variations of a vector that is known to be good, vectors that are calculated by static algorithms, and others.

The POC then enters a first Check-Refresh step 404, and checks if the performance of the current vector set is substantially inferior (e.g., by a lower by a preset amount) from the performance of a previous vector set and, hence, algorithm refresh is required (a technique to determine if refresh is needed according to an example embodiment will be described below, with reference to FIG. 5). If the performance is not substantially inferior (including the case wherein the performance is improved), a refresh is not needed, and the POC proceeds to Mutate step 406. In step 406 the POC mutates vectors (e.g., 20%) of the vector-set, by modifying the parameters that the vectors specify. According to the example embodiment illustrated in FIG. 4, the mutation intensity is determined responsive to the performance of the vector; for example, in an embodiment, the distance (e.g., the difference) between the performance of the vector and the performance of the best performing vector of the vector set is calculated, and each parameter of the vector is either multiplied or divided (randomly selected) by a factor that is determined responsive to the distance.

The mutated vectors generated in step 406 comprise a new vector set. In a second Check-Refresh step 408, the POC checks the performance of the new set, to determine if a refresh is needed. If, in step 408 refresh is not needed, the POC enters a Crossbreed step 410 and generates a new set of P vectors by crossbreeding pairs of vectors from the current vector set (crossbreeding was described with reference to FIG. 3). After step 410, the POC reenters step 404, and starts a new iteration.

If, in step 404 or in step 408, the POC determines that a refresh is needed, the POC enters a Refresh step 412, wherein the POC introduces intense changes to the parameter values of the vector set. The POC then reenters Mutate step 406. In each of steps 406, 410 and 412, when the POC generates new vectors, the POC checks the new vectors against the parameter ruleset and the cross-parameter ruleset, and regenerates vectors that do not comply with any or both rulesets.

In summary, according to the example method described in FIG. 4, the POC continuously modifies the NCD's operation parameters by mutating candidate vectors and crossbreeding the mutated vectors to form new candidate vectors. Each of the generated vectors is activated (that is—the parameters specified by the vector are stored in the NCD's configuration registers), and the respective performance is measured, affecting further mutations and/or crossbreeding. If this process results in performance degradation above a preset threshold (relative to past performance), the POC refreshes the algorithm by intensely modifying the vector set.

Figure 5:
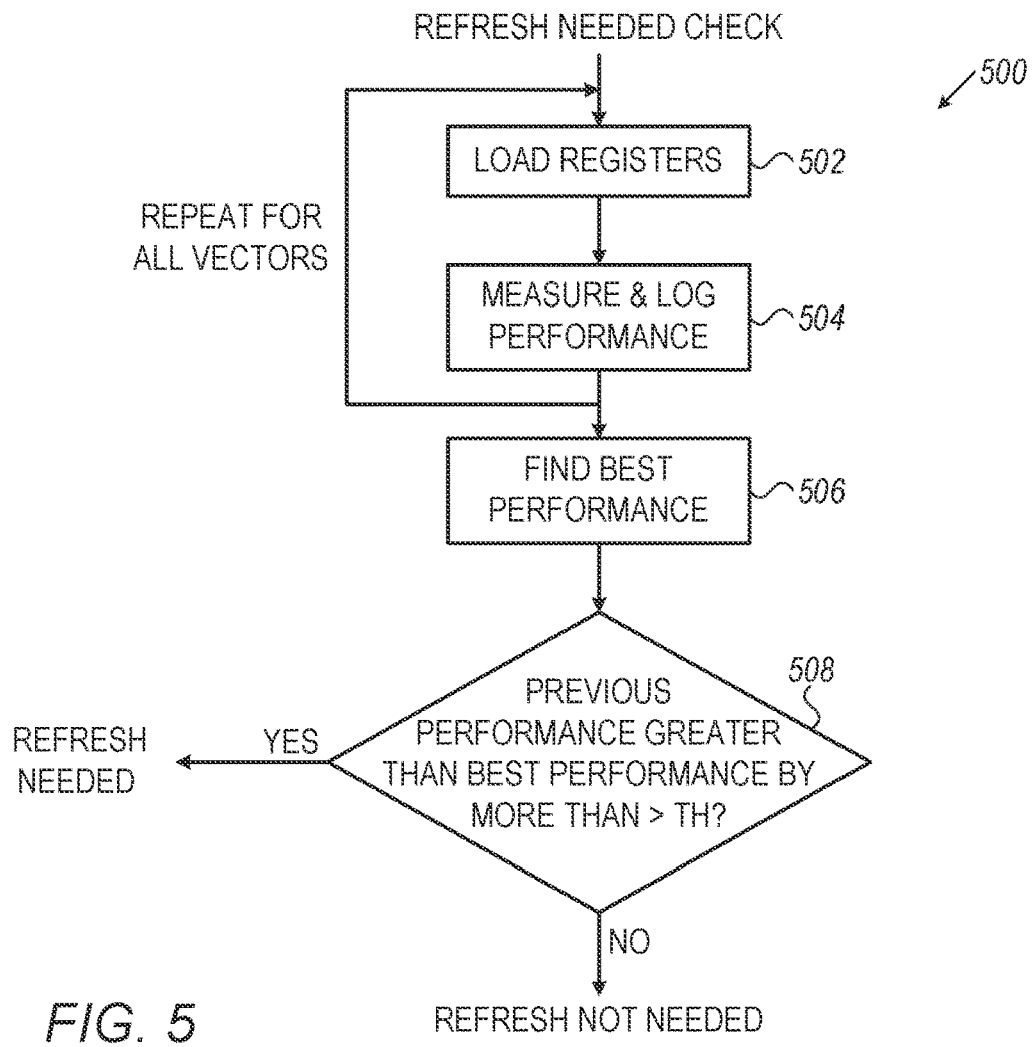
FIG. 5 is a flowchart that schematically describes a method for checking if an algorithm refresh is required, in accordance with an embodiment of the present invention.

FIG. 5 is a flowchart 500 that schematically describes a method for checking if an algorithm refresh is required, in accordance with an embodiment of the present invention. The flowchart is executed by POC 116 (FIG. 1) and may be invoked during the execution of a genetic algorithm (e.g., steps 404, 408 of FIG. 4).

The flowchart starts at a Load Registers step 502, wherein the POC loads the parameter values specified by a first vector into corresponding configuration registers. Next, the POC enters a Measure and Log step 504 wherein the POC reads a relevant performance measure (e.g., from Performance Monitoring circuit 112, FIG. 1) of the vector, and logs the performance measure. The POC then reenters step 502 and repeats the loop comprising steps 502 and 504 for all vectors of the vector-set.

Next, at a Find-Best-Performance step 506, the POC checks the logged performance measures, and finds the best performance obtained by the current vector-set. Lastly, in a Check Performance Decrease step 508, the POC checks whether the performance decrease relative to a previous performance meets a certain condition, e.g. is more than a preset threshold. If so, the POC determines that the algorithm should be refreshed; otherwise, the algorithm may continue (e.g.—enter Crossbreed step 410 or Mutate step 404, FIG. 4).

As would be appreciated, the methods described in FIGS. 3, 4 and 5 above are example methods that are cited by way of example. Methods in accordance with the disclosed techniques are not limited to the description hereinabove. For example, in alternative embodiments, when the parameters specified by a mutated or a crossbred vector are loaded to the configuration registers, if a severe drop in performance is observed, the vector may be dropped from the vector set. In some embodiments, the intensity of the mutation is determined by a combination of absolute and relative performance measures. In an embodiment, multiple copies of the algorithm may run concurrently, e.g., for orthogonal performance measures.

Examples of Relevant Performance Aspects

Embodiments according to the present invention may be used to optimize a variety of NCD performance aspects. The following is a partial list of examples.

1. Receive Bandwidth. By manipulating operation parameters such as size of buffers, coalescing width and "occupied bytes in the air limit" (the number of bytes that the NCD reserves in memory upon sending a read request, for storing the expected completion & returned data, i.e., the number of bytes that are permitted to be "in-flight" en-route to the NCD), the receive bandwidth may vary. In embodiments, the POC may adjust the operation parameters in real time, optimizing the receive bandwidth, responsive to varying communication mixes.

Figure 6:
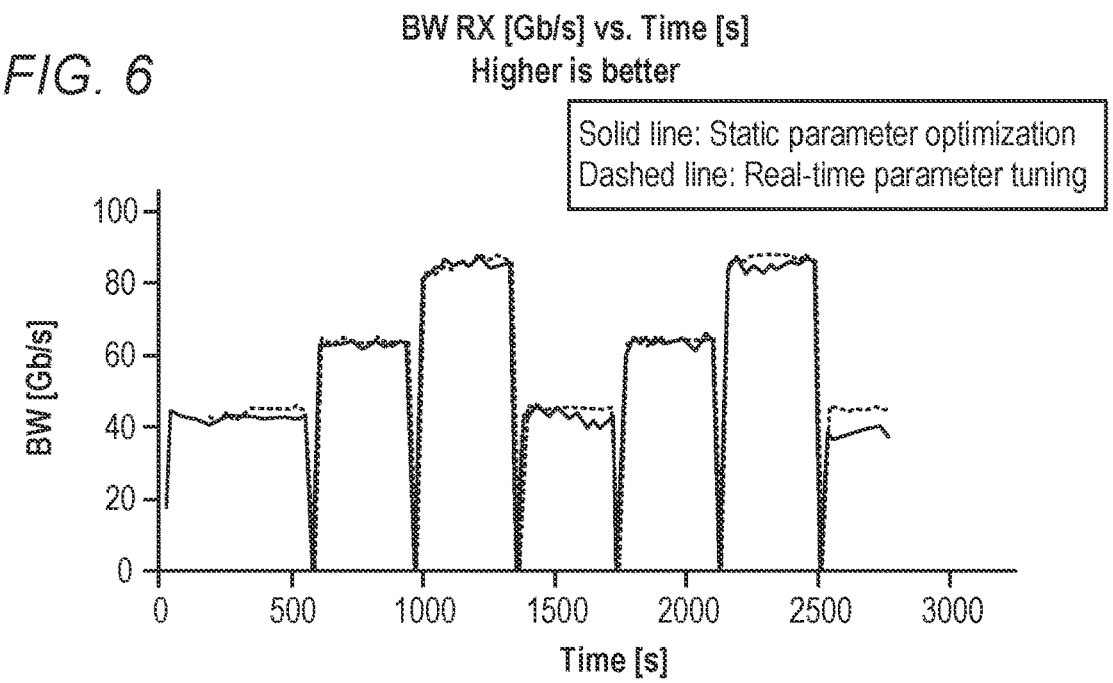
FIG. 6 is a performance versus time waveform diagram that compares receive bandwidth performance of an NCD with fixed operation parameters to the performance of an NCD with real-time performance tuning, in accordance with an embodiment of the present invention.

FIG. 6 is a performance versus time waveform diagram that compares receive bandwidth performance of an NCD with fixed operation parameters to the performance of an NCD with real-time performance tuning, in accordance with an embodiment of the present invention. The vertical axis is the receive bandwidth, in giga-bit-per-second (Gbps). The horizontal axis is time in seconds. The dotted line displays the performance using real-time parameter tuning according to an embodiment of the present invention, whereas the solid line depicts the performance when an optimized set of static parameters are used. Seven different communication mixes are exercised. As can be observed, the performance when using real time parameter tuning is almost always better than the fixed-parameters performance.

2. Transmit Bandwidth. The Transmit bandwidth may be controlled by manipulating operation parameters such as packet length, size of buffers, coalescing width and "occupied bytes in the air" limit. In embodiments, the POC tunes the transmit bandwidth by adjusting the relevant operation parameters in real time, adopting to varying communication mixes.

Figure 7:
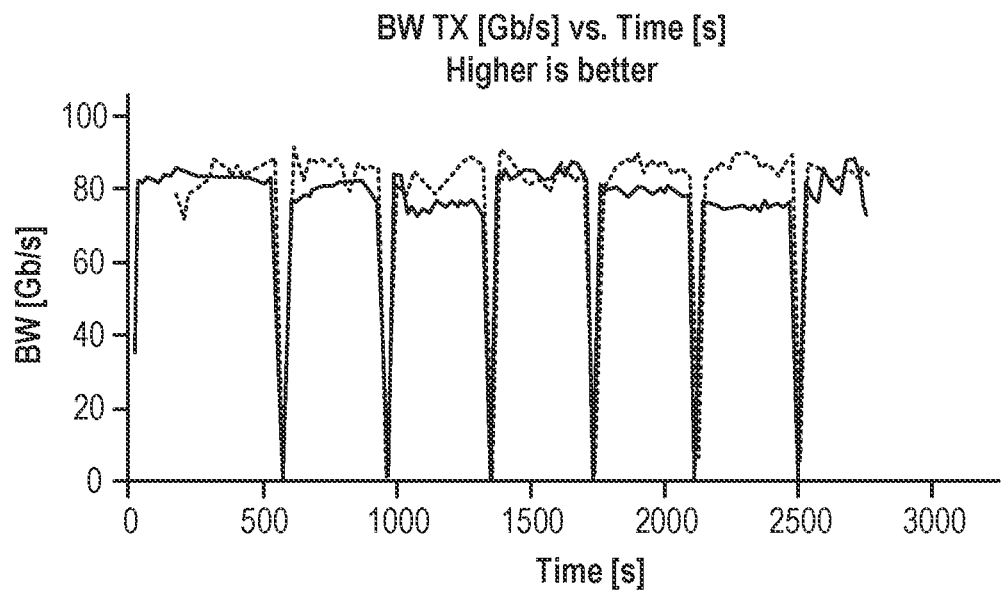
FIG. 7 is a performance versus time waveform diagram that compares transmit bandwidth performance of an NCD with fixed operation parameters to the performance of an NCD with real-time performance tuning, in accordance with an embodiment of the present invention.

FIG. 7 is a performance versus time waveform diagram that compares transmit bandwidth performance of an NCD with fixed operation parameters to the performance of an NCD with real-time performance tuning, in accordance with an embodiment of the present invention. As can be observed, the real-time tuning performance is clearly better than the fixed-parameter performance.

Figure 8:
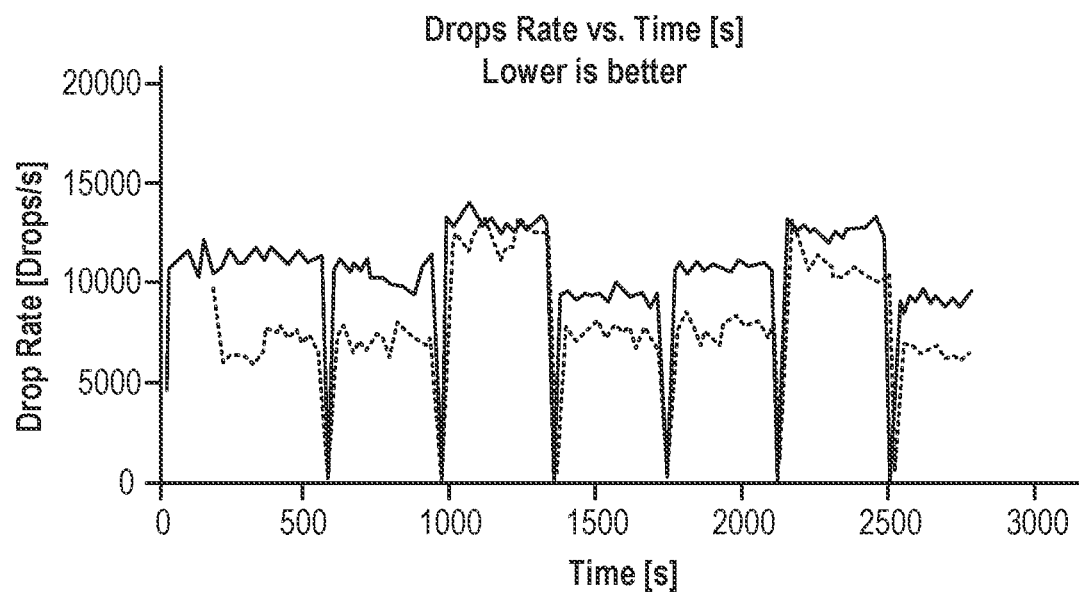
FIG. 8 is a performance versus time waveform diagram that compares packet drop rate performance of an NCD with fixed operation parameters to the performance of an NCD with real-time performance tuning, in accordance with an embodiment of the present invention.

3. Drop Rate (in lossy networks). By manipulating operation parameters such size of buffers, coalescing width and "occupied bytes in the air" limit, the rate of packet-drops in a lossy network may be lowered. In embodiments, the parameters are tuned in real time, to minimize packet drops when the communication nature changes. FIG. 8 is a performance versus time waveform diagram that compares packet drop rate performance of an NCD with fixed operation parameters to the performance of an NCD with real-time performance tuning, in accordance with an embodiment of the present invention. The vertical axis is the drop rate, in packets per second. As can be observed, packet dropping rate is significantly lower when using the real-time parameter tuning method according to an embodiment of the present invention.

4. Pause rate (lossless networks)—in embodiments, the POC tunes in real time operation parameters such as size of buffers, coalescing width and occupied bytes in the air limit to minimize operation pauses.

5. Combined Latency/memory utilization—in an embodiment, the POC tunes in real-time Rebalancer Algorithm parameters, such as algorithm comparators types and free lines quantity, to achieve minimum latency and maximum physical memory utilization.

6. Bit-Error-Rate (BER) performance—real-time tuning of BER-reduction algorithm parameters such as feed forward equalization weights and parameters of continuous time linear equalization in optical communication devices, to achieve minimum BER.

7. Real time tuning of the parameters of a Data-Center-Quantized-Congestion-Notification (DCQCN) congestion control algorithm, such as minimum time between congestion notification packets and reaction point threshold, to maximize bandwidth and minimize latency, packet drop rate and packet pause rate (DCQCN algorithm is described, for example, in "Congestion Control for Large-Scale RDMA Deployments," Zhu et al., SIGCOMM '15, Aug. 17-21, 2015).

8. Combined performance measures—to avoid the improvement of some performance measures at the expense of other performance measures, combined performance measures may be defined and optimized. For example, power consumption should be minimized, but the cost in bandwidth should not be high. In an embodiment, a performance measure may be bandwidth/power consumption (e.g., in Gbps/watt). In other embodiments, more elaborate performance measures may be used, which combine multiple performance aspects.

The configuration and methods disclosed hereinabove, including NCD 102, POC 116; flowcharts 200, 300, 400 and 500 are example configurations and methods that are shown purely for the sake of conceptual clarity. Any other suitable configurations and flowcharts can be used in alternative embodiments.

Elements of POC 116 and/or NCD 102 may be implemented using suitable hardware, such as in one or more Application-Specific Integrated Circuits (ASICs) or Field-Programmable Gate Arrays (FPGAs), using software, using hardware, or using a combination of hardware and software elements. In some embodiments, POC 116 comprises a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device (ND), comprising:
packet processing circuitry, which is connected to a network and is configured to process communication packets for communicating over the network, the packet processing circuitry comprising a plurality of configuration registers for setting one or more operation parameters of the ND; and
performance optimization circuitry, configured to improve a performance measure of the ND by continuously iteratively performing:
executing a genetic algorithm that continuously modifies candidate sets of the operation parameters;
calculating the performance measure based on the candidate sets of the operation parameters modified by the genetic algorithm; and
adjusting values of one or more of the configuration registers to values different than current values, wherein the adjusting of the values of the configuration registers to different values is performed regardless of the performance measure, while an intensity of the adjustment is selected based on the performance measure.

2. The ND according to claim 1, wherein the optimization circuitry is configured to adjust the values of the one or more of the configuration registers responsively to a parameter ruleset, which sets one or more constraints on the one or more of the operation parameters.

3. The ND according to claim 1, wherein the optimization circuitry is configured to adjust the values of the one or more of the configuration registers responsively to a cross-parameters ruleset, which sets one or more constraints on inter-dependency between at least two of the operation parameters.

4. The ND according to claim 1, wherein the optimization circuitry is configured to improve the performance measure of the ND by continuously iteratively performing:
managing a predetermined number of candidate vectors, each vector specifying values of the operation parameters for the configuration registers, wherein the predetermined number of candidate vectors includes a plurality of vectors; and modifying the candidate vectors in an iterative process, responsively to the performance measures of the candidate vectors.

5. The ND according to claim 4, wherein the optimization circuitry is configured to:

store a value of the performance measure at a first stage of the iterative process;

at a second, later stage of the iterative process, assess an extent of change of the performance metric relative to the stored value; and refresh one or more of the candidate vectors responsively to the value exceeding a threshold.

6. The ND according to claim 1, wherein the optimization circuitry is configured to improve the performance measure of the ND by, using the genetic algorithm, continuously iteratively modifying a group of a predetermined number of candidate vectors, each candidate vector specifying values of the operation parameters for the configuration registers, wherein the genetic algorithm comprises: i) a parents selection step, in which pairs of candidate vectors are selected, ii) a cross-over step, in which child vectors are generated by mixing values of pairs of candidate vectors, iii) a mutation step, in which mutated child vectors are generated by modifying the child vectors and, iv) a fittest-selection step, in which candidate vectors for an iteration are selected responsively to the performance measure of the mutated child vectors of a previous iteration.

7. The ND according to claim 1, wherein the optimization circuitry is configured to improve the performance measure of the ND by, using the genetic algorithm, iteratively modifying a group of candidate vectors, each vector specifying a respective subset of the configuration registers, wherein the genetic algorithm comprises: i) a mutation step, in which candidate vectors are modified, and ii) a cross-over step, in which child vectors are generated by mixing values of pairs of candidate vectors.

8. The ND according to claim 1, wherein the performance measure is indicative of a receive bandwidth.

9. The ND according to claim 1, wherein the performance measure is indicative of a transmit bandwidth.

10. The ND according to claim 1, wherein the performance measure is indicative of a packet drop rate.

11. The ND according to claim 1, wherein the performance measure is indicative of a packet pause rate.

12. The ND according to claim 1, wherein the performance measure is indicative of a combination of latency and memory utilization.

13. The ND according to claim 1, wherein the performance measure is indicative of a bit-error rate (BER).

14. A method in a network device (ND) connected to a network, the method comprising:

using packet processing circuitry in the ND, processing communication packets for communicating over the network, wherein the packet processing circuitry comprises a plurality of configuration registers for setting one or more operation parameters of the ND; and using performance optimization circuitry in the ND, improving a performance measure of the ND by continuously iteratively performing:

executing a genetic algorithm that continuously modifies candidate sets of the operation parameters;

calculating the performance measure based on the candidate sets of the operation parameters modified by the genetic algorithm; and adjusting values of one or more of the configuration registers to values different than current values, wherein the adjusting of the values of the configuration registers is performed regardless of the performance measure, while the intensity of the adjustment is selected based on the performance measure.

15. The method according to claim 14, wherein adjusting the values of the one or more of the configuration registers is performed responsively to a parameter ruleset, which sets one or more constraints on the one or more of the operation parameters.

16. The method according to claim 14, wherein adjusting the values of the one or more of the configuration registers is performed responsively to a cross-parameters ruleset, which sets one or more constraints on inter-dependency between at least two of the operation parameters.

17. The method according to claim 14, wherein improving the performance measure of the ND comprises:

managing a predetermined number of candidate vectors, each vector specifying values of the operation parameters for the configuration registers, wherein the predetermined number of candidate vectors includes a plurality of vectors; and modifying the candidate vectors in an iterative process, responsively to the performance measures of the candidate vectors.

18. The method according to claim 17, wherein improving the performance measure of the ND comprises:

storing a value of the performance measure at a first stage of the iterative process;

at a second, later stage of the iterative process, assessing an extent of change of the performance metric relative to the stored value; and refreshing one or more of the candidate vectors responsively to the value exceeding a threshold.

19. The method according to claim 14, wherein improving the performance measure of the ND comprises, using the genetic algorithm, iteratively modifying a group of candidate vectors, each vector specifying a respective subset of the configuration registers, wherein the genetic algorithm comprises: i) a parents selection step, in which pairs of candidate vectors are selected, ii) a cross-over step, in which child vectors are generated by mixing values of pairs of candidate vectors, iii) a mutation step, in which mutated child vectors are generated by modifying the child vectors and, iv) a fittest-selection step, in which candidate vectors for an iteration are selected responsively to the performance measure of the mutated child vectors of a previous iteration.

20. The method according to claim 14, wherein improving the performance measure of the ND comprises, using the genetic algorithm, iteratively modifying a group of candidate vectors, each vector specifying a respective subset of the configuration registers, wherein the genetic algorithm comprises: i) a mutation step, in which candidate vectors are modified, and ii) a cross-over step, in which child vectors are generated by mixing values of pairs of candidate vectors.

21. The ND according to claim 1, wherein the performance optimization circuitry is configured to adjust the values of the one or more of the configuration registers randomly, with an expectancy determined responsively to the performance measure.

22. The ND according to claim 1, wherein the performance optimization circuitry is configured to additionally check if the calculated performance measure is inferior and wherein the performance optimization circuitry adjusts values of one or more of the configuration registers both if the calculated performance measure is determined as inferior and if the calculated performance measure is determined as not inferior.

23. The ND according to claim 1, wherein the performance optimization circuitry repeatedly performs iterations of executing the genetic algorithm, calculating the performance measure and adjusting values of one or more of the configuration registers, wherein the adjusting is performed in each iteration.

24. The ND according to claim 1, wherein the intensity of the adjustment is selected as an expectancy of a ratio between the adjusted values and the current values.

25. The ND according to claim 4, wherein the intensity of the adjustment is selected responsive to a distance between a performance of the current values and a performance of a best performing vector of the candidate vectors.

26. The ND according to claim 25, wherein adjusting the values comprises randomly selecting whether to multiply or divide and accordingly multiplying or dividing the current values by a factor determined responsive to the distance.

* * * * *